J. M. ODEN.
HOSE COUPLING.
APPLICATION FILED JULY 21, 1916.
1,288,148.
Patented Dec. 17, 1918.
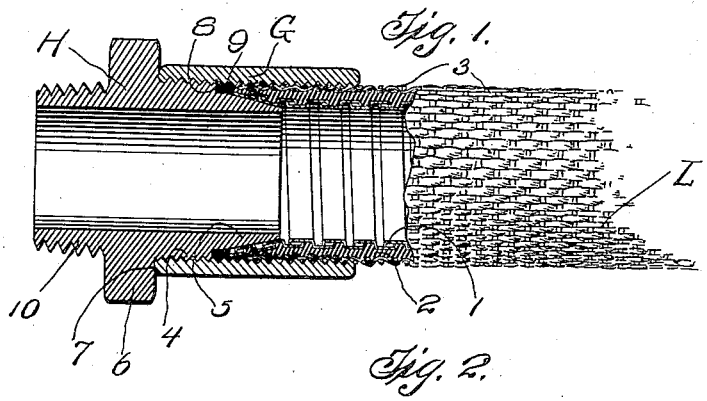
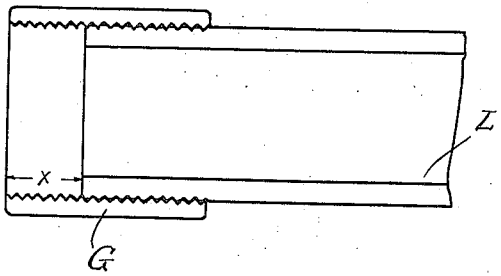
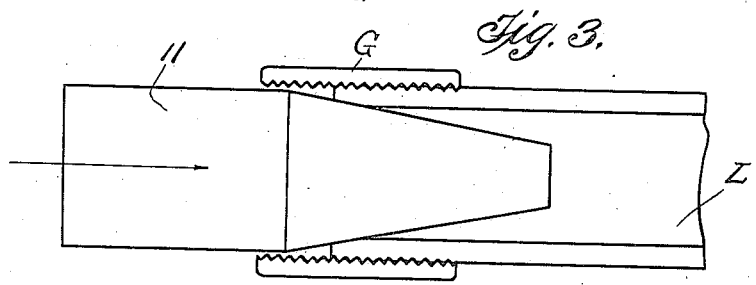
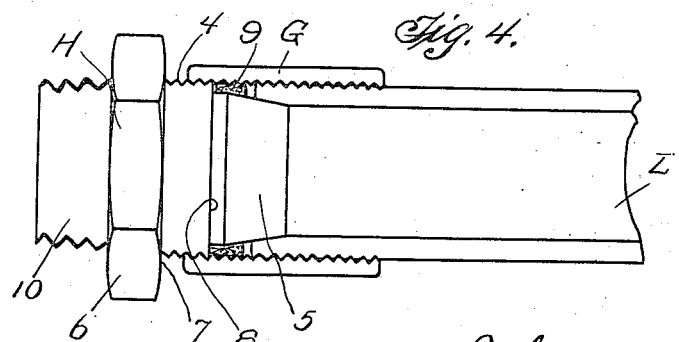
Inventor
John M. Oden
By his Attorney
L. Gifford Hander

UNITED STATES PATENT OFFICE.

JOHN M. ODEN, OF BROOKLYN, NEW YORK.

HOSE-COUPLING.

1,288,148.  Specification of Letters Patent.  Patented Dec. 17, 1918.

Application filed July 21, 1916. Serial No. 110,429.

*To all whom it may concern:*

Be it known that I, JOHN M. ODEN, residing at Brooklyn, in the county of Kings and State of New York, have invented certain new and useful Improvements in Hose-Couplings, of which the following is a specification.

This invention relates to a hose coupling and to a method to be followed for the attachment of the coupling to the end of a hose.

The particular object of the invention is to provide a new simplified and highly efficient coupling, and one which is particularly adapted for use in connection with a hose having a metal lining.

A further object is to provide a coupling which will comprise means for coöperating with the metal lining of a hose to render the whole non-static.

A further object is to provide a new and improved method to be followed in attaching the coupling.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown a merely preferred form of embodiment of the invention:

Figure 1 is a longitudinal central sectional view through a coupling constructed in accordance with the principles of this invention, showing the same applied to the end of a hose; and Figs. 2, 3 and 4 are diagrammatic views illustrating the principal successive steps employed for connecting the coupling with the hose, as shown in Fig. 1.

Referring to the drawings for a detailed description of the structure illustrated therein, the reference character L indicates the hose, the reference character G indicates a sleeve which forms part of the coupling, and H indicates the body of the coupling.

The hose illustrated is commercially known as "Triplexd" hose, being formed of an inner lining 1 of metal, a filler 2 of rubber, or composition, and an outer casing or cover 3 of woven canvas, or the like. The metal lining 1 is formed of a spirally wound strip so as to render the same easily flexible, in a manner well-known in the art.

The sleeve G is screw-threaded interiorly and is of a size to fit snugly over the outer surface of the hose L, the threads of the sleeve engaging the slight protuberances formed by the weave of the canvas cover 3 of the hose.

The sleeve is arranged so that it projects somewhat beyond the end of the hose.

The body H is formed with an externally threaded portion 4 for engaging the threads of the extending portion of the sleeve G. A tapered extension 5 is formed beyond the portion 4 arranged to be forced into the end of the tube to clamp the tube tightly against the inner surface of the sleeve G. A hexagonal portion 6 is provided for rotating the body, said hexagonal portion providing a shoulder 7 for engaging against the adjacent end of the sleeve to limit the inward movement of the body. The shoulder 8 is provided at the larger end of the tapered portion 5 of the body and a gasket 9 of felt, leather, or the like, is interposed between said shoulder and the adjacent end of the hose, said gasket being tightly compressed when the body is screwed home so as to effectually seal the joint between the hose and the body.

At the opposite side of the hexagonal portion 6 an extension 10 is provided by means of which connection may be made with any desired object. The extension 10 may be threaded either interiorly or exteriorly according to requirements.

In attaching the coupling of this invention to the hose, the sleeve G is first positioned upon the hose, as shown in Fig. 2. The distance X between the end of the hose and the end of the extending portion of the sleeve is properly proportioned with respect to the relative proportions of the parts of the body H.

The step illustrated in Fig. 3 is that of inserting a suitable tapered tool 11 for expanding the end portion of the metallic lining 1. This step may be performed either before or after the sleeve G is placed in position or it may even be omitted altogether in some cases. It is preferable that it be used, however, in order to provide a sufficient start for the function to be performed by the tapering portion 5 of the body.

After the sleeve has been arranged, as in

Fig. 2, (and also after the tool 11 has been used as in Fig. 3, if desired) the body of the coupling is introduced. The proportion of the parts is preferably such that an efficient grip will be present between the threaded portion 4 of the body and the threaded extending portion of the sleeve before any appreciable spreading function has been performed by the tapered portion 5 of the body. Where the tool 11 has been employed for providing an initial spreading, a very desirable surface extent of the metallic lining is in engagement with the tapered portion 5 of the body by the time an efficient grip is afforded between the portion 4 of the body and the extending portion of the sleeve, as clearly shown in Fig. 4.

After the parts have been arranged into position, approximately as shown in Fig. 4, the hose L and sleeve G are held stationary, as if integral, and the body L is rotated relatively thereto so as to cause the threads of the portion 4 to advance along the threads of the extending portion of the sleeve. The necessary force is applied to continue the rotation until the shoulder 7 of the body abuts the adjacent end of the sleeve. During the rotation the tapered portion 5 is advanced into the hose so as to exert a bursting force thereon which is resisted by the sleeve. The result is that the end portion of the hose is clamped and squeezed tightly between the tapered portion 5 and the interior surface of the sleeve, the material of the hose being forced into the threads of the sleeve under a powerful pressure.

The engagement of the threads with the material of the hose prevents any creeping action of the sleeve along the hose during rotation of the body.

Fig. 1 of the drawings illustrates the condition of the several parts after the body has been screwed home.

It might be mentioned that although the sleeve G is shown to be threaded throughout its length, nevertheless it is only the extending portion of said sleeve which is necessarily threaded.

It should be noted that the coarse cover 3 of the hose provides an excellent surface for gripping the threads or the like of the sleeve, that the metallic lining 1 provides an excellent surface for frictional coöperation with the tapered portion 5 of the body, and that the rubber or other elastic filler 2 provides an ideal material to receive the compression incident to the movement of the tapered portion 5 into its set position.

It should be noted that the metallic lining, by its strength and stiffness, maintains unchanged the interior diameter of the hose during the application of the sleeve. It forms a solid foundation for the resilient filler to press against in resisting the squeezing action from the sleeve as the sleeve is threaded on to the exterior surface of the canvas cover. The filler is thus enabled to exert a strong pressure to hold the protuberances of the canvas tightly into engagement with the threads of the sleeve. The metallic lining, also by its strength and stiffness, prevents the buckling back of any part of the hose during the advance of the tapered portion of the body.

Where a metal lined hose is employed, and where danger exists of static discharges, the structure of this invention has a particular advantage in that it positively brings the parts of the coupling into excellent metallic connection with the hose lining and thereby avoids likelihood of static discharges.

Having thus described my invention what I claim as new and desire to secure by Letters Patent is:—

1. The combination with a hose having a metallic lining, a woven fabric cover, and a compressible resilient filler between the lining and the cover, of a coupling device attached to the end of the hose, said coupling device comprising a body part and a sleeve part, the sleeve part being internally threaded substantially throughout its length and being attached to the hose by being screwed into telescoping relation over the end of the hose, the sleeve standing with a portion of its interior threaded surface projecting beyond the end of the hose and with the remainder of its interior threaded surface lapping the exterior surface of the hose so that the threads engage into and about the multitudinous protuberances forming the outer surface of the woven cover, the metallic lining of the hose serving to sustain the pressure and maintain undiminished the interior diameter of the hose when the sleeve is applied, and the resilient filler serving to yieldingly but forcefully hold the cover outwardly into engagement with the threads of the sleeve, the body part comprising a tubular member arranged with its bore in continuation of the interior of the hose, the body part having its exterior wall at the inner end tapered and extending into the end of the hose within the sleeve, the body part also having a threaded exterior surface engaging the interior threaded surface of the projecting portion of the sleeve whereby rotation of the body part relatively to the sleeve will cause the body part to progress into the sleeve and the tapered portion to wedge inwardly along the inner surface of the adjacent portion of the metallic lining of the hose expanding said portion of the lining and compressing the adjacent portion of the filler to cause the protuberances of the adjacent portion of the cover to engage more tightly with the threads of the sleeve, the body part also having an annular shoulder outstanding at the base of its tapered portion in opposition to the end surface of the hose, and a gasket held between said shoulder and said end surface of the hose, together with means formed upon the body part whereby to attach it to a device to which it is desired to connect the hose.

2. In a device of the class described, comprising a hose having a canvas cover, the canvas cover, by its weave, affording a number of protuberances on the exterior surface of the hose, the combination therewith of a coupling made up of an exteriorly threaded body member and an interiorly threaded sleeve, the sleeve being of a size to be screwed over the end of the hose with the threads of the sleeve tightly interengaging with the protuberances of the canvas cover to thereby faciliate the threading-on operation and to retain the sleeve in position, the sleeve being positioned with a portion of its threads projecting beyond the end of the hose, and the body member being screwed in to the projecting threaded portion of the sleeve and having a tapered extension entering the hose and adapted by the continued threading of the body member into the sleeve to spread the hose to thereby cause the protuberances of the adjacent portion of the canvas to engage more tightly with the threads of the sleeve.

In testimony whereof I affix my signature in the presence of two witnesses.

JOHN M. ODEN.

Witnesses:
L. GESSFORD HANDY,
HARRY M. HEYN.